US012412456B2

(12) United States Patent
Ajhar et al.

(10) Patent No.: US 12,412,456 B2
(45) Date of Patent: Sep. 9, 2025

(54) WAGERING GAME PLAY FEATURE WITH ROTATING MATRIX OF GAME SYMBOLS

(71) Applicant: IGT, Las Vegas, NV (US)

(72) Inventors: Nathan Ajhar, Sparks, NV (US); Lauren Hillstrom, Reno, NV (US); Nicholas Hillstrom, Reno, NV (US); Yu Chong, Reno, NV (US)

(73) Assignee: IGT, Las Vegas, NV (US)

( * ) Notice: Subject to any disclaimer, the term of this patent is extended or adjusted under 35 U.S.C. 154(b) by 175 days.

(21) Appl. No.: 18/341,510

(22) Filed: Jun. 26, 2023

(65) Prior Publication Data

US 2024/0428656 A1 Dec. 26, 2024

(51) Int. Cl.
*G07F 17/32* (2006.01)

(52) U.S. Cl.
CPC ...... *G07F 17/3267* (2013.01); *G07F 17/3213* (2013.01); *G07F 17/3293* (2013.01)

(58) Field of Classification Search
None
See application file for complete search history.

(56) References Cited

U.S. PATENT DOCUMENTS 9,922,503 B2 * 3/2018 Jasper .................... G07F 17/34
2008/0234032 A1 * 9/2008 Brunet de Courssou .................... G07F 17/3209 463/20
2013/0252699 A1 * 9/2013 Nauman ............ G07F 17/3265 463/20
2021/0241570 A1 * 8/2021 Robinson ............ G07F 17/3265

* cited by examiner

*Primary Examiner* — Jason T Yen
(74) *Attorney, Agent, or Firm* — Sage Patent Group

(57) ABSTRACT

A wagering game includes an array of N first game symbols and a matrix of second game symbols in a first rotational position, each first game symbol corresponding to a respective row of N second game symbols. For each row of second game symbols, based on a determination that none of the second game symbols in the row have a higher value than the corresponding first game symbol, an award is provided. The matrix is then rotated to a second rotational position such that each first game symbol of the array corresponds to a respective column of N second game symbols. For each column of second game symbols in the second rotational position, based on a determination that none of the second game symbols in the column have a higher value than the corresponding first game symbol, provide an award to a player of the wagering game.

17 Claims, 14 Drawing Sheets

WAGERING GAME PLAY FEATURE WITH ROTATING MATRIX OF GAME SYMBOLS

BACKGROUND

Embodiments described herein relate to game play features with wagering games, and in particular to a wagering game play feature in a gaming environment, such as in a casino environment, with a rotating matrix of game symbols, and related devices, systems, and methods. Some wagering games, such as slot games and/or video poker games provided at Electronic Gaming Machines (EGMs) and/or mechanical gaming devices in a casino environment, may include unique game features, such as in a bonus game, as an additional incentive for play of a wagering game. In some configurations, play of the base wagering game may trigger a bonus game randomly, in response to game play activity in the base wagering game, and/or in response to other criteria. There is a need for providing additional options for player interaction and enjoyment to encourage wagering game play.

BRIEF SUMMARY

According to some embodiments, a system includes a processor circuit and a memory coupled to the processor circuit. The memory comprises machine readable instructions that, when executed by the processor circuit, cause the processor circuit to initiate a wagering game at a gaming device, display, by a display device of the gaming device, an array of N first game symbols in a first direction, and display, by the display device, a matrix of second game symbols in a first rotational position, the matrix comprising N columns of second game symbols in the first direction and N rows of second game symbols in a second direction orthogonal to the first direction, each first game symbol of the array corresponding to a respective row of N second game symbols. For each row of second game symbols in the first rotational position, the instructions cause the processor circuit to determine whether each second game symbol has a higher value than the corresponding first game symbol and, based on a determination that none of the second game symbols in the row have a higher value than the corresponding first game symbol, provide an award to a player of the wagering game. The instructions further cause the processor circuit to rotate the matrix to a second rotational position such that each first game symbol of the array corresponds to a respective column of N second game symbols and, for each column of second game symbols in the second rotational position, determine whether each second game symbol has a higher value than the corresponding first game symbol and, based on a determination that none of the second game symbols in the column have a higher value than the corresponding first game symbol, provide an award to a player of the wagering game.

According to some examples, a gaming device includes an input device, a display device, a processor circuit, and a memory coupled to the processor circuit. The memory includes machine readable instructions that, when executed by the processor circuit, cause the processor circuit to, based on receipt of a game initiation input at the input device, initiate a wagering game, display, the display device, an array of first game symbols, and display, by the display device, a matrix of second game symbols in a first arrangement, the first arrangement comprising a first plurality of paylines, each payline corresponding to a respective first game symbol. For each payline of the first plurality of paylines in the first arrangement, the instructions cause the processor circuit to determine whether each second game symbol has a higher value than the corresponding first game symbol and, based on a determination that none of the second game symbols in the row have a higher value than the corresponding first game symbol, provide an award to a player of the wagering game. The instructions further cause the processor circuit to arrange the second game symbols in the matrix to a second arrangement different from the first arrangement, the second arrangement comprising a second plurality of paylines different from the first plurality of paylines, each payline of the second plurality of paylines corresponding to a respective first game symbol and, for each payline of the second plurality of paylines in the second arrangement, determine whether each second game symbol has a higher value than the corresponding first game symbol and, based on a determination that none of the second game symbols in the payline have a higher value than the corresponding first game symbol, provide an award to a player of the wagering game.

According to some embodiments, a method includes Initiating, by a processor circuit, a wagering game at a gaming device, displaying, by a display device, an array of first game symbols, and displaying, by the display device, a matrix of second game symbols in a first arrangement, the first arrangement comprising a first plurality of paylines, each payline corresponding to a respective first game symbol. The method further includes, for each payline of the first plurality of paylines in the first arrangement, determining, by the processor circuit, whether each second game symbol has a higher value than the corresponding first game symbol and, based on a determination that none of the second game symbols in the row have a higher value than the corresponding first game symbol, providing an award to a player of the wagering game. The method further includes arranging the second game symbols in the matrix to a second arrangement different from the first arrangement, the second arrangement comprising a second plurality of paylines different from the first plurality of paylines, each payline of the second plurality of paylines corresponding to a respective first game symbol and, for each payline of the second plurality of paylines in the second arrangement, determining, by the processor circuit, whether each second game symbol has a higher value than the corresponding first game symbol and, based on a determination that none of the second game symbols in the payline have a higher value than the corresponding first game symbol, providing an award to a player of the wagering game.

DETAILED DESCRIPTION

Embodiments described herein relate to game play features with wagering games, and in particular to a wagering game play feature in a gaming environment, such as in a casino environment, with a rotating matrix of game symbols, and related devices, systems, and methods. According to some embodiments, a wagering game includes an array of N first game symbols and a matrix of second game symbols in a first rotational position, each first game symbol corresponding to a respective row of N second game symbols. For each row of second game symbols, based on a determination that none of the second game symbols in the row have a higher value than the corresponding first game symbol, an award is provided. The matrix is then rotated to a second rotational position such that each first game symbol of the array corresponds to a respective column of N second game symbols. For each column of second game symbols in the second rotational position, based on a determination that none of the second game symbols in the column have a higher value than the corresponding first game symbol, provide an award to a player of the wagering game.

Figure 1:
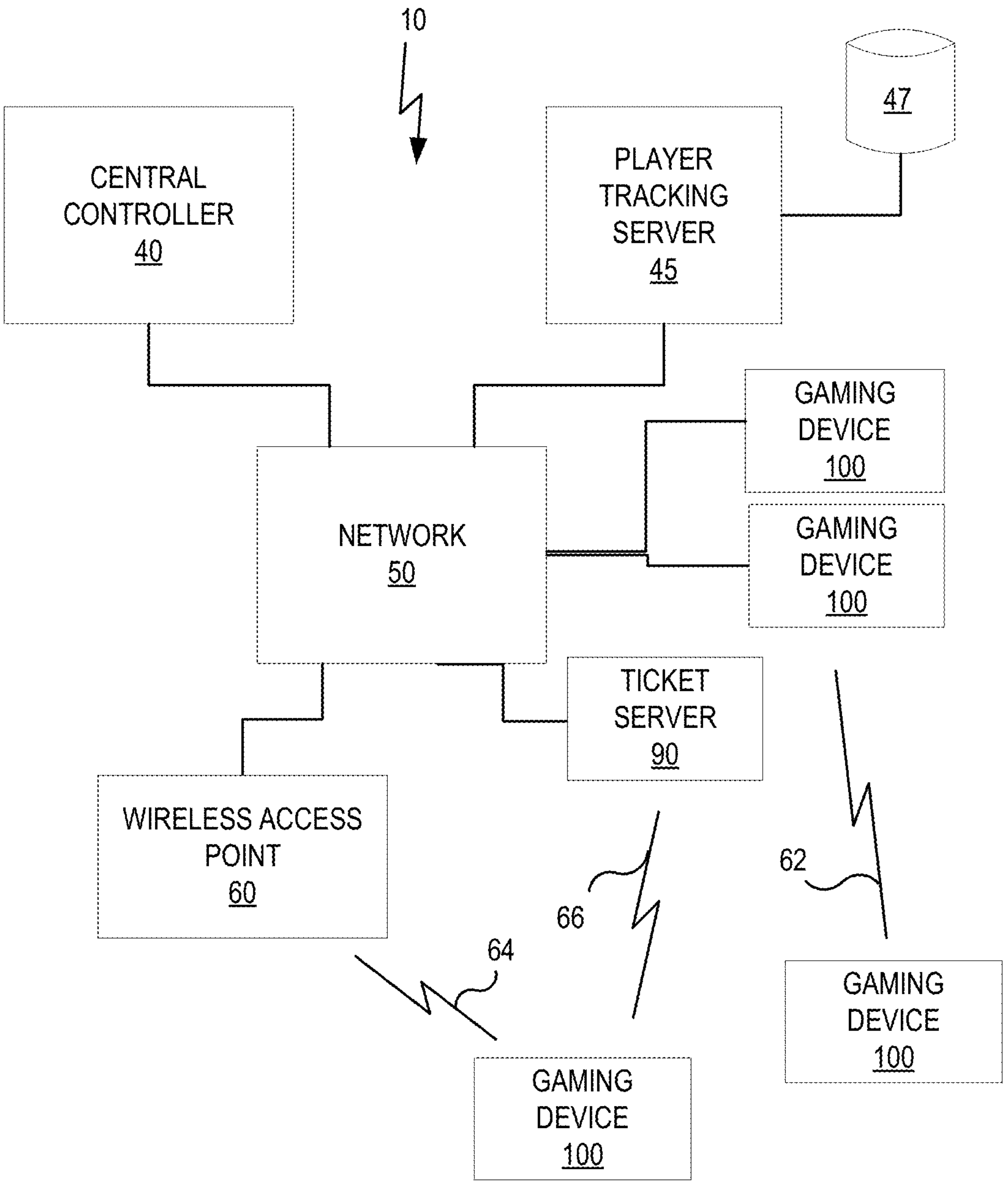
FIG. 1 is a schematic block diagram illustrating a network configuration for a plurality of gaming devices according to some embodiments.

Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
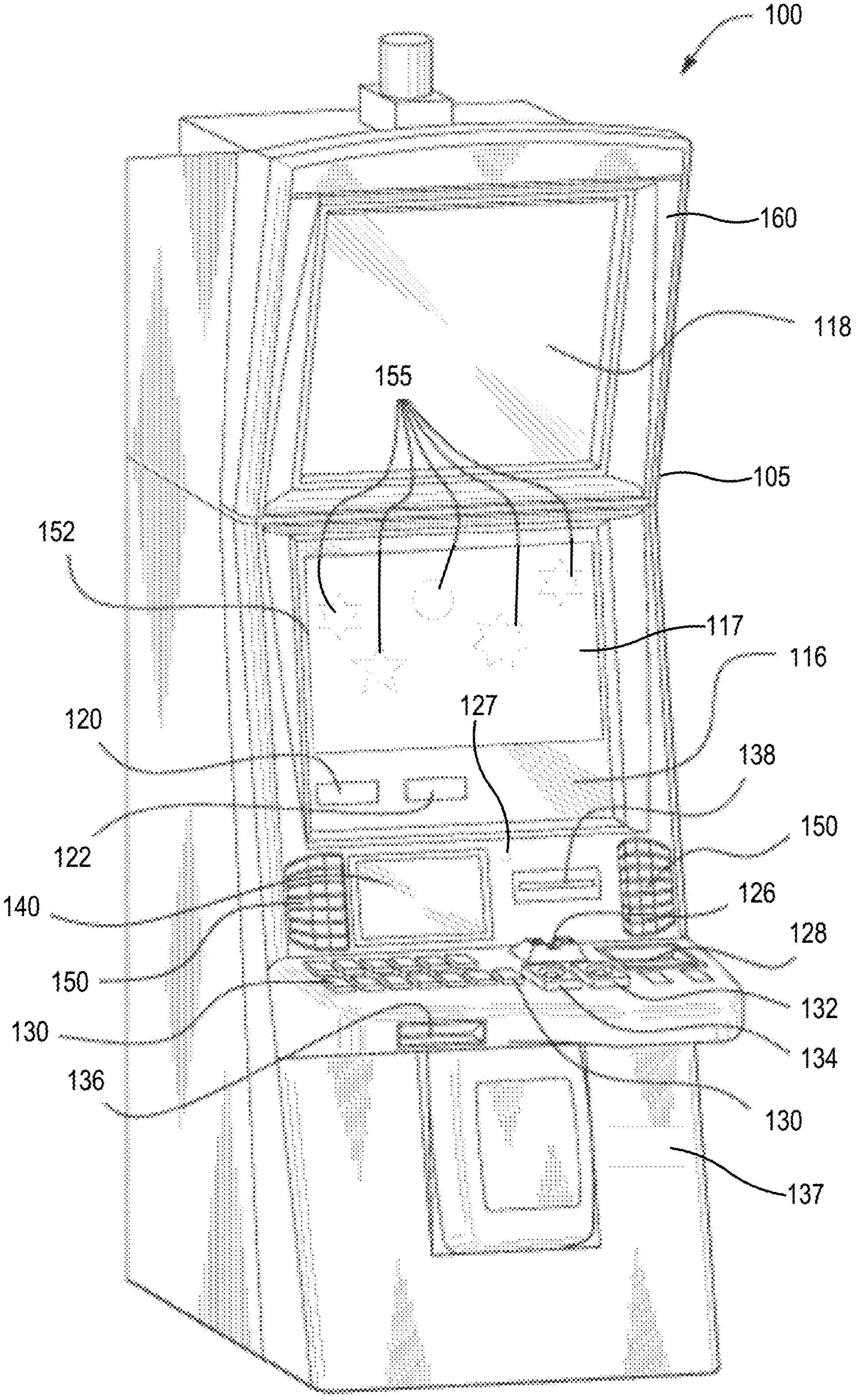
FIG. 2A is a perspective view of a gaming device that can be configured according to some embodiments.
Figure 2B:
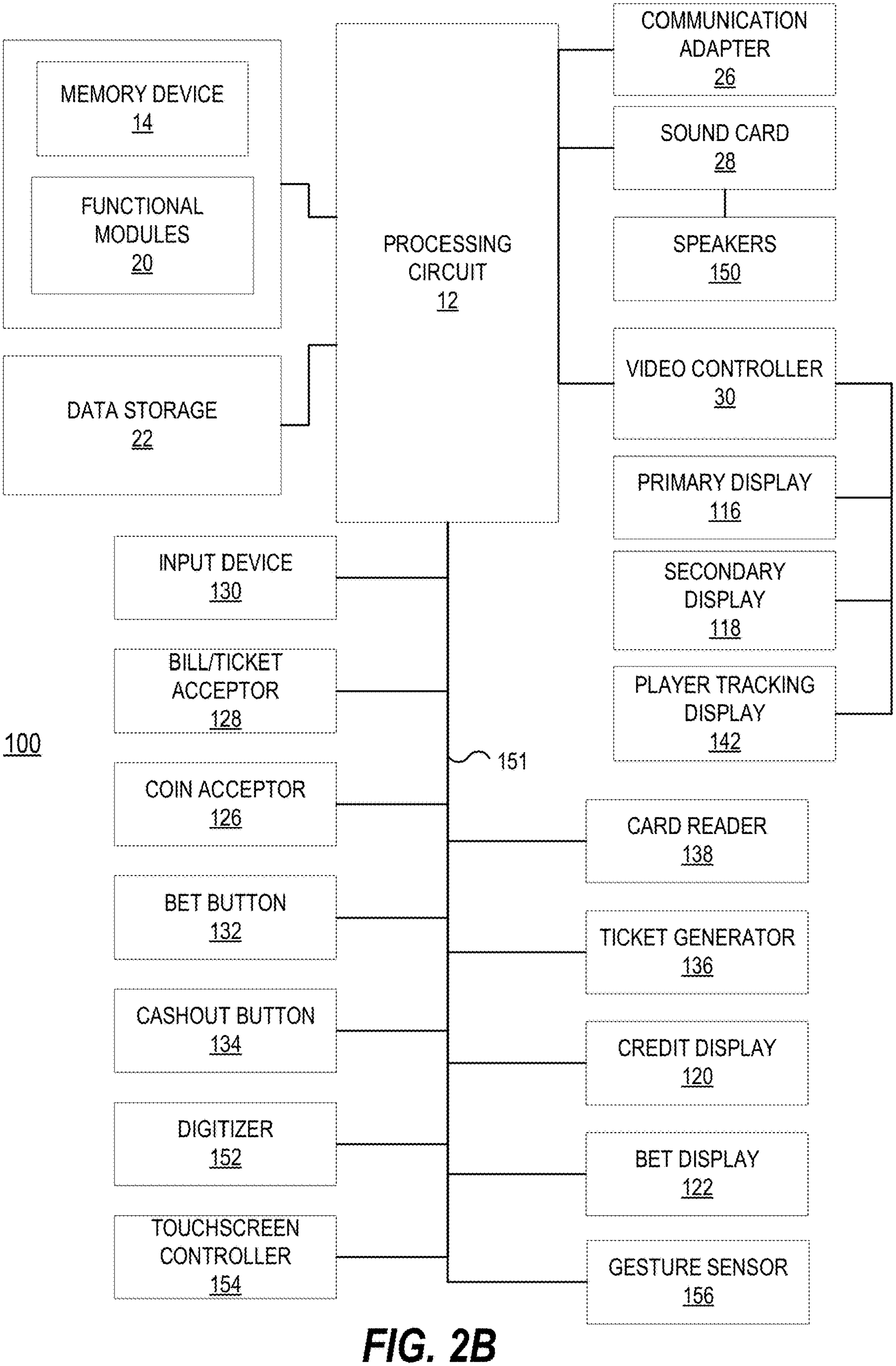
FIG. 2B is a schematic block diagram illustrating an electronic configuration for a gaming device according to some embodiments.
Figure 2C:
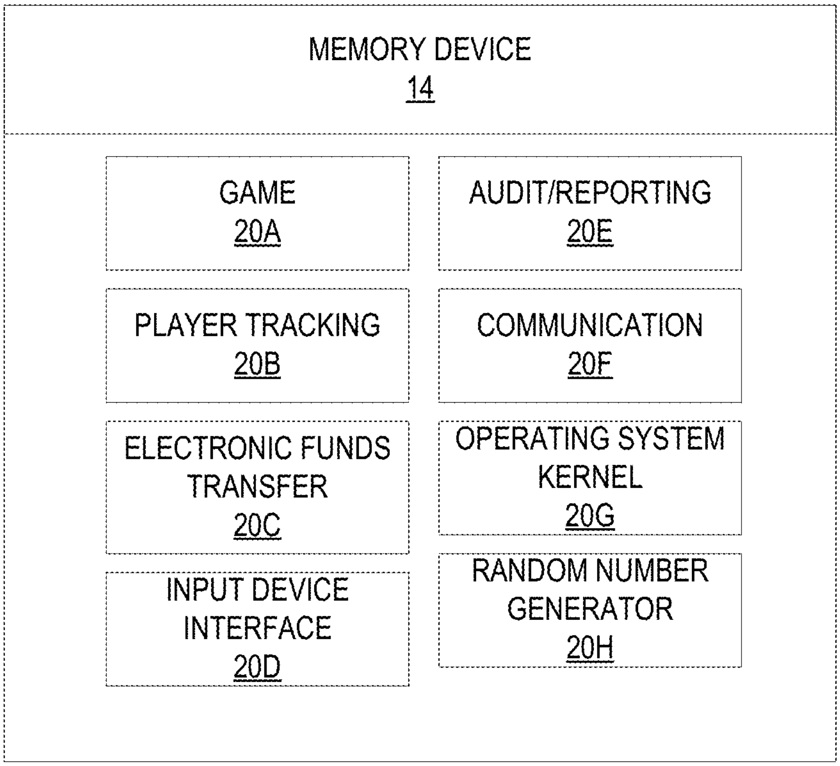
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
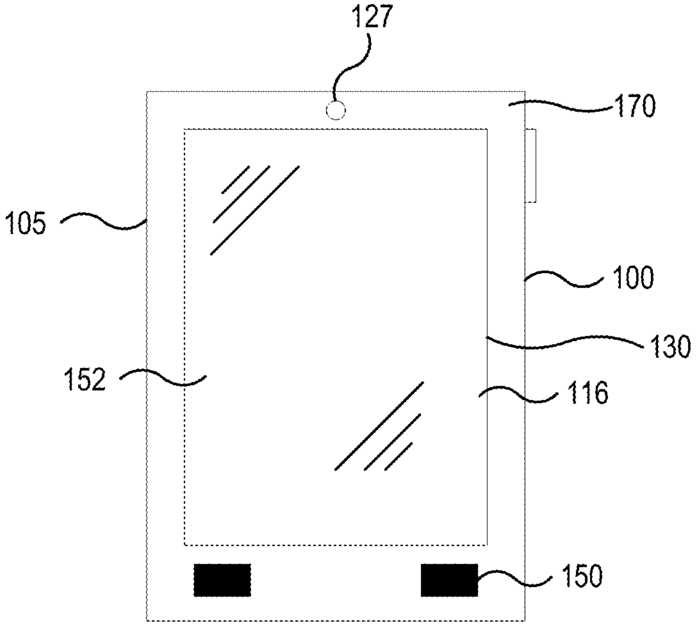
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
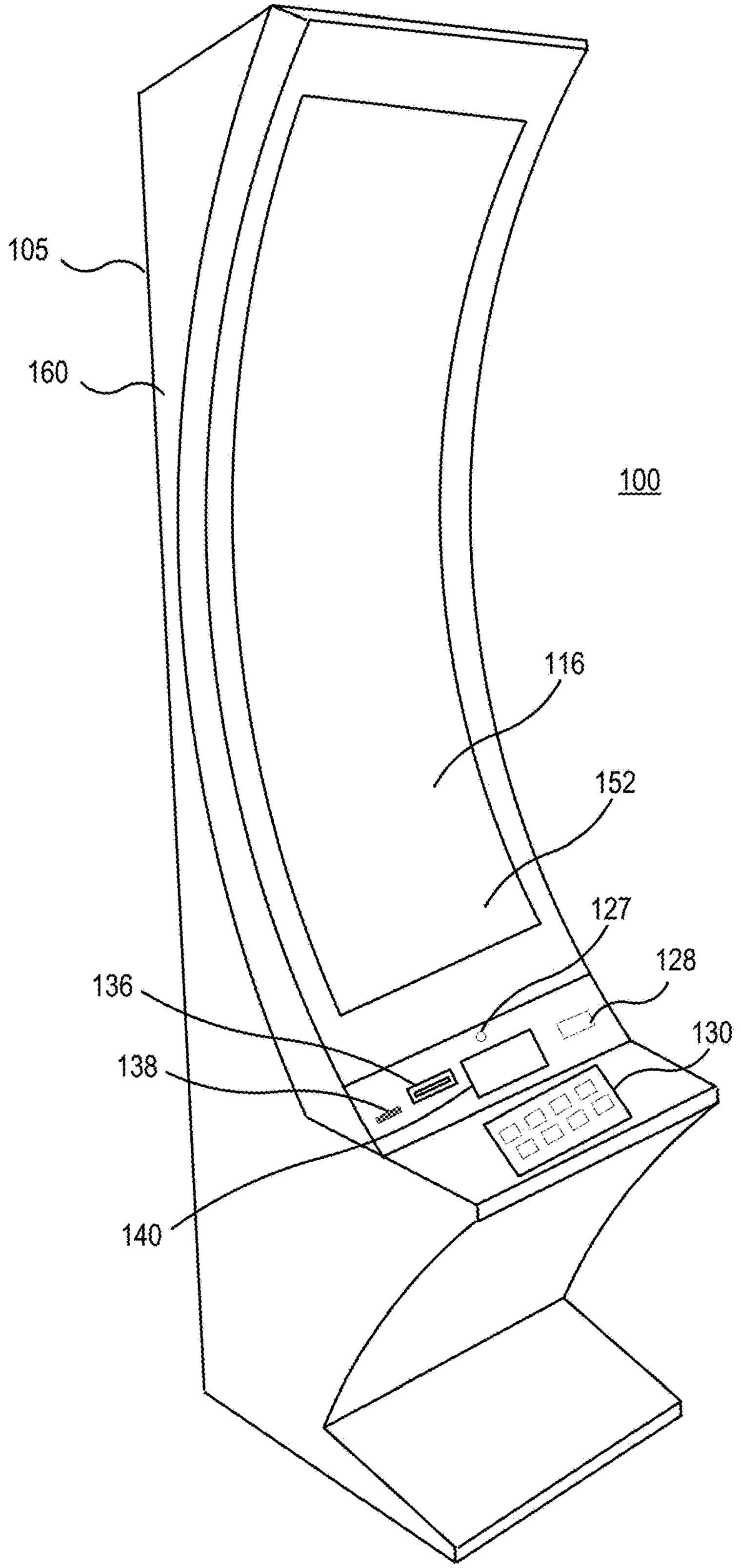
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

FIGS. 3A-3E are diagrams of a graphical user interface (GUI) 300 at an EGM 100 for wagering game including a bonus game with a rotating matrix of game symbols, according to some embodiments. The GUI 300 may include a credit meter 302, a bet button 304, and a plurality of game elements 306, including a plurality of game symbols 308 (e.g., playing card symbols in this example). While features will be described in relation to a slot style bonus game, it should be understood that features disclosed herein may be used with any number of different types of wagering games, including primary games, as desired. In this example, the GUI 300 is displayed on a primary display device 116, but it should be understood that elements of the GUI 300 may be displayed on other display devices, such as a secondary display device 118 for example, as desired.

Figure 3A:
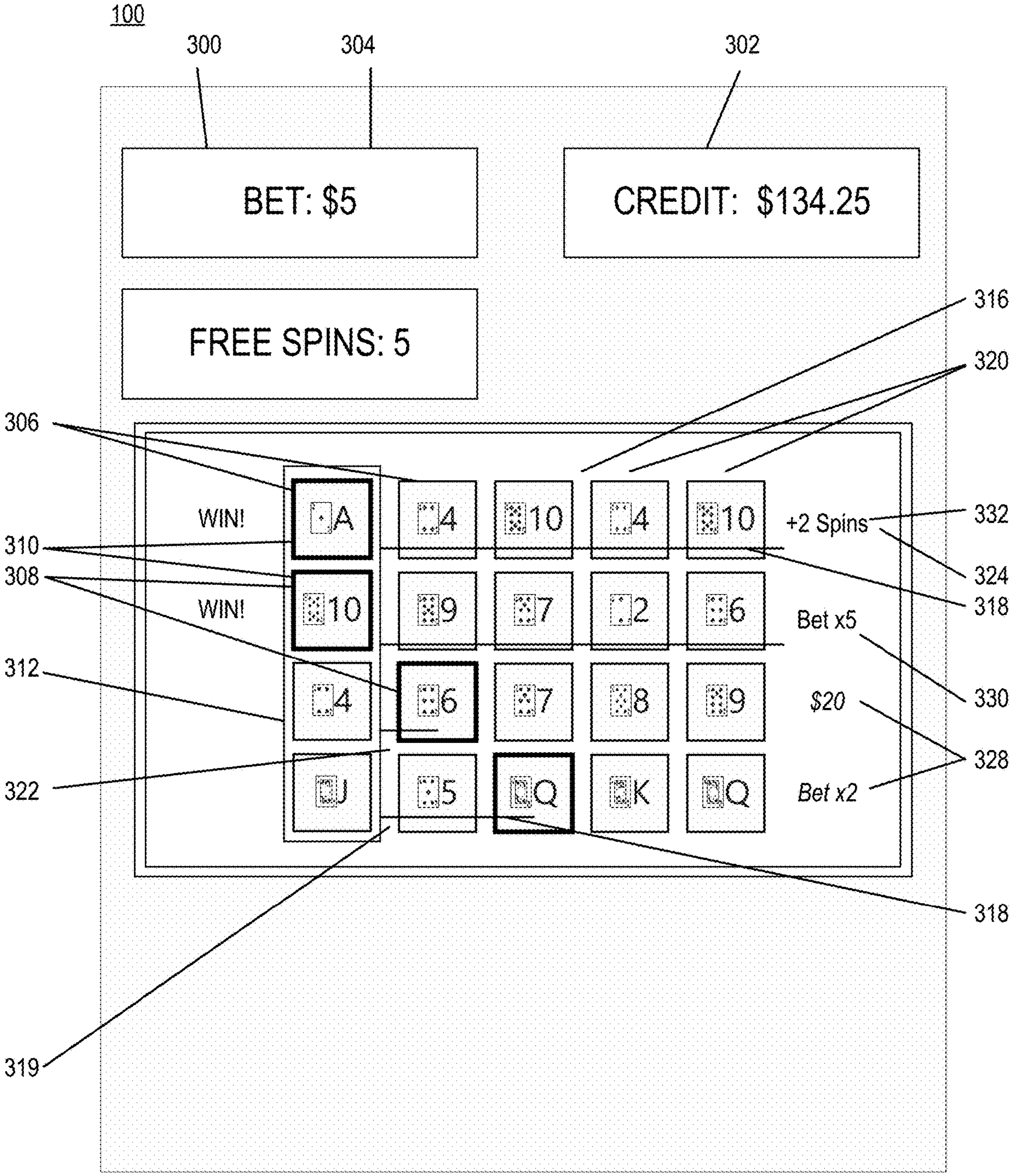
FIGS. 3A-3E are diagrams of a graphical user interface (GUI) illustrating a bonus game with a rotating matrix of game symbols, according to some embodiments.

As shown in FIG. 3A, the game symbols 308 include an array 312 of N first game symbols 310. In this example, the array 312 is arranged in a vertical direction, but it should be understood that arrangements in the horizontal direction and other directions are contemplated. In this example, N=4, but it should be understood that N may be a different number, as desired. In response to initiation of a wagering game, e.g., a bonus game in this example, the first game symbols 310 may be provided and displayed, e.g., randomly selected. A matrix 316 of second game symbols 314 is then provided and displayed, e.g., randomly selected and arranged in a plurality of N rows 319 in the horizontal direction and N columns 320 in the vertical direction (i.e., orthogonal to the horizontal direction), with each row 319 defining a payline 318 corresponding to a respective first game symbol 310 in this example. The matrix 316 is arranged in an initial position (i.e., a first rotational position 322) in FIG. 3A.

For each payline 318 of F symbols 314 in the first rotational position 322, the game determines whether each second game symbol 314 in the respective payline 318 has a higher value than the corresponding first game symbol 310. Based on a determination that none of the second game symbols 314 in the payline 318 have a higher value than the corresponding first game symbol 310, an award 324 is provided to the player.

The awards 324 may include a monetary award 330, a free spin 332, a multiplier 334, or other types of awards, as desired. In this example, based on a determination that any of the second game symbols 314 in the payline 318 have a higher value than the corresponding first game symbol 210, the potential award 328 for the row 320, so that the player can know that the award would have been for that row 320.

Figure 3B:
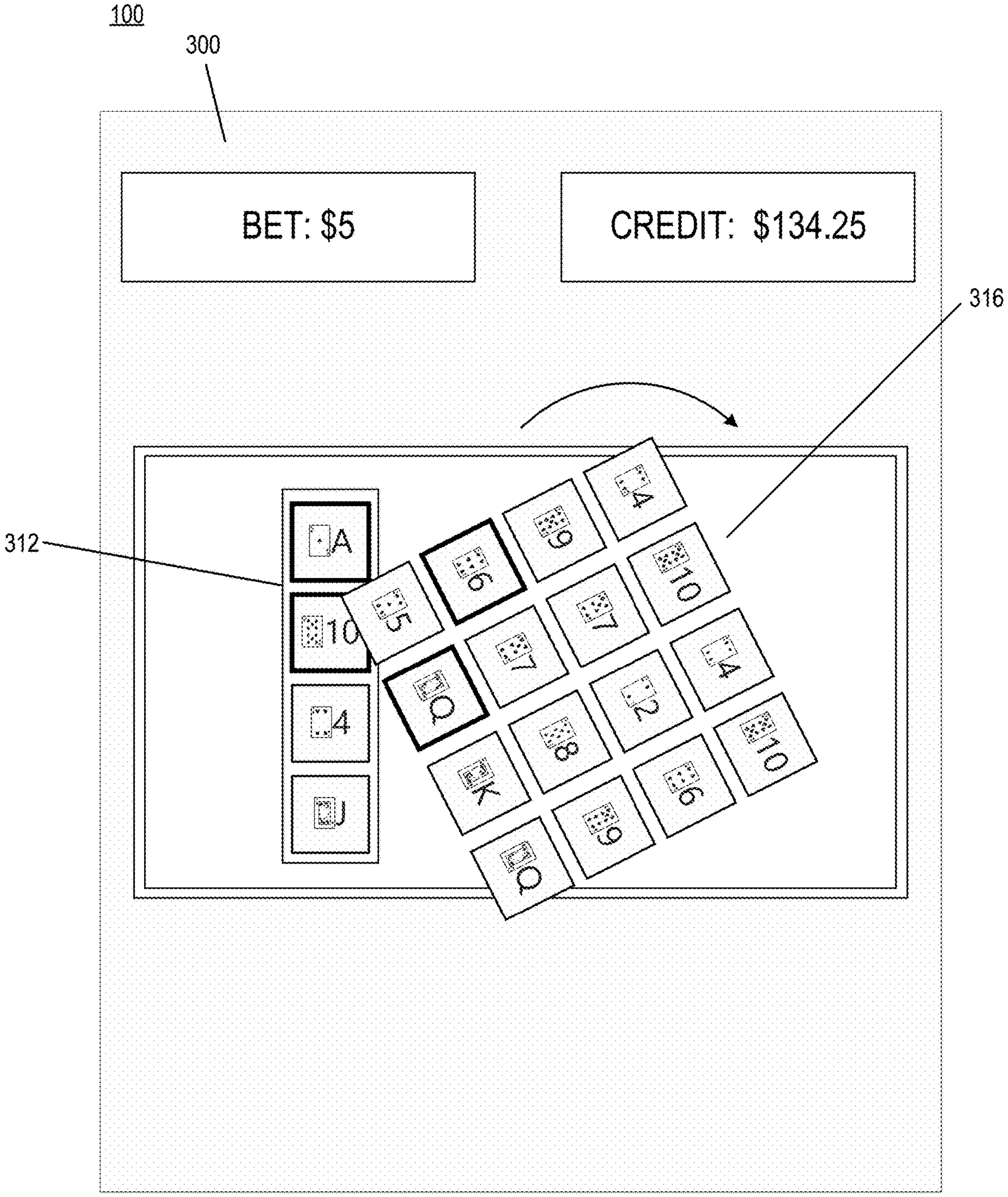
Figure 3C:
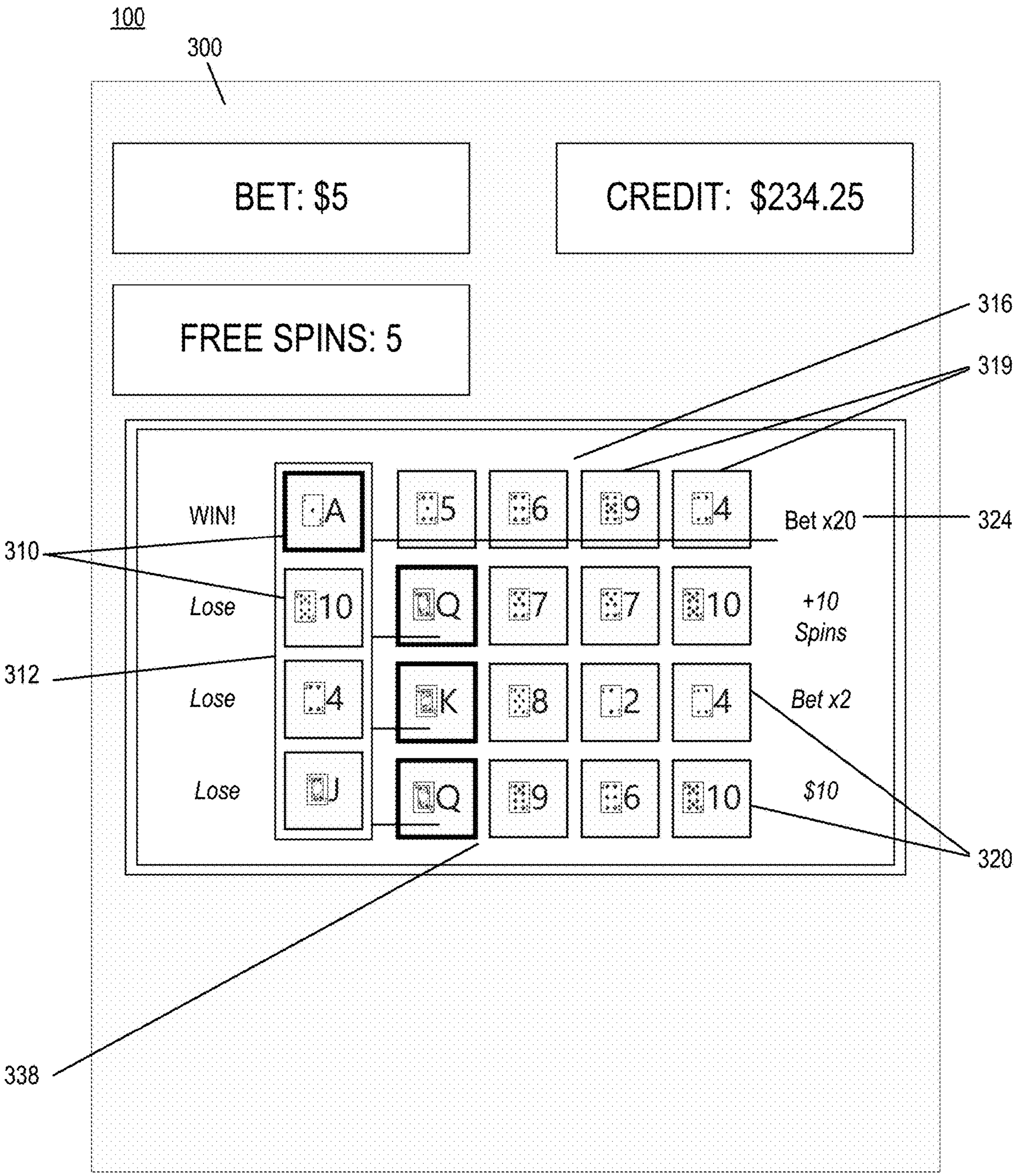

As shown in FIGS. 3B and 3C, the matrix 316 is next rotated (ninety degrees in this example) to a second rotational position 338 such that each first game symbol 310 of the array 312 corresponds to a respective column 320 of N second game symbols 314 (i.e., with each column 320 now arranged in the horizontal direction to define a new set of paylines 318 and each row 319 arranged in the vertical direction). For each payline 318 of second game symbols 314 in the second rotational position 338, the game determines whether each second game symbol 314 has a higher value than the corresponding first game symbol 310. Based on a determination that none of the second game symbols 314 in the payline 318 have a higher value than the corresponding first game symbol 310, an award 324 is provided to the player.

Figure 3D:
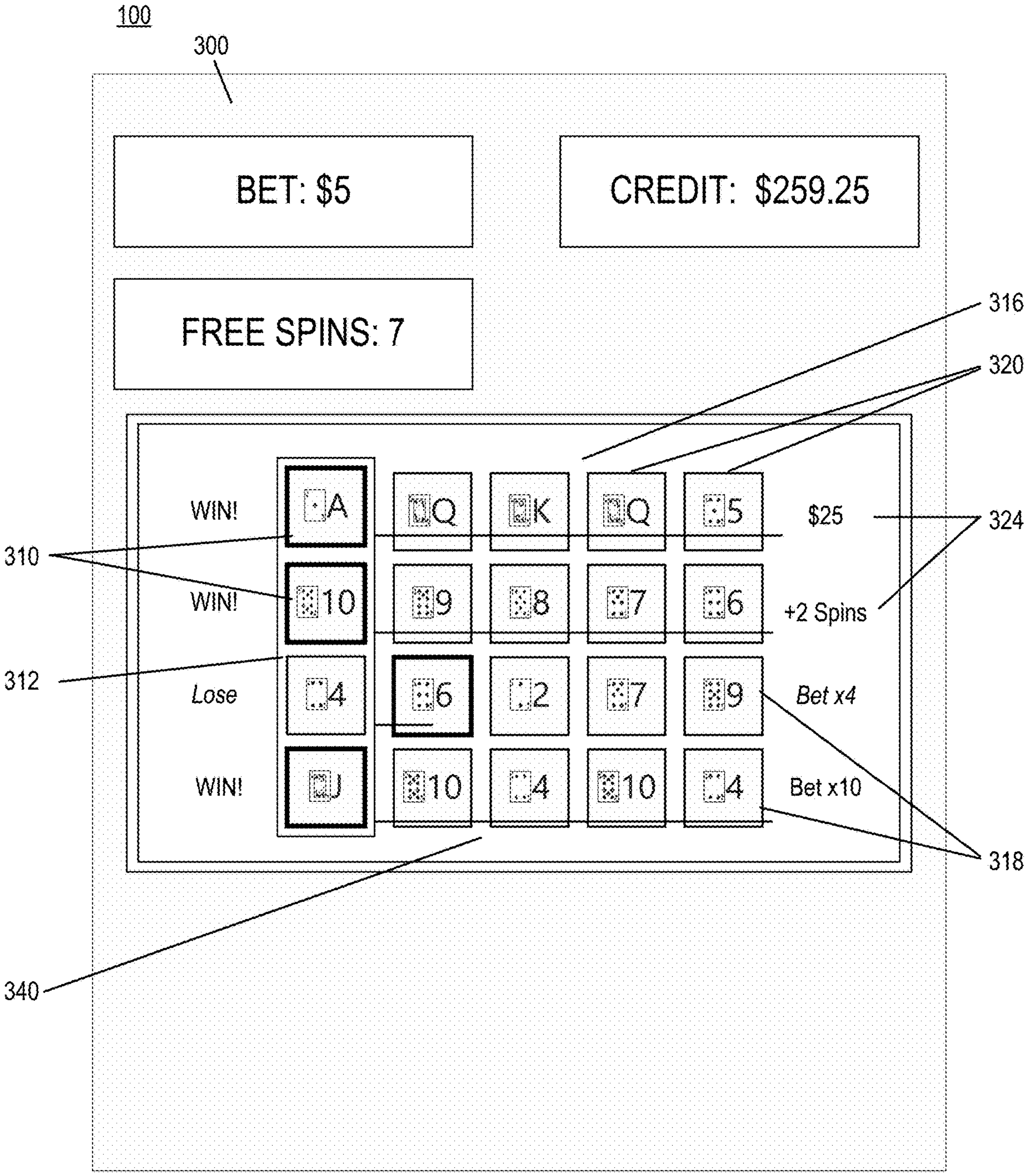

As shown by FIGS. 3D, this rotation and re-comparison can continue for a third rotational position 340, such that each first game symbol 310 corresponds to a different respective payline 318 of second game symbols 314. In this example, N is an even number, to avoid a center first game symbol from being compared to the same payline of second game symbols in the first and third rotational positions 322, 340.

Figure 3E:
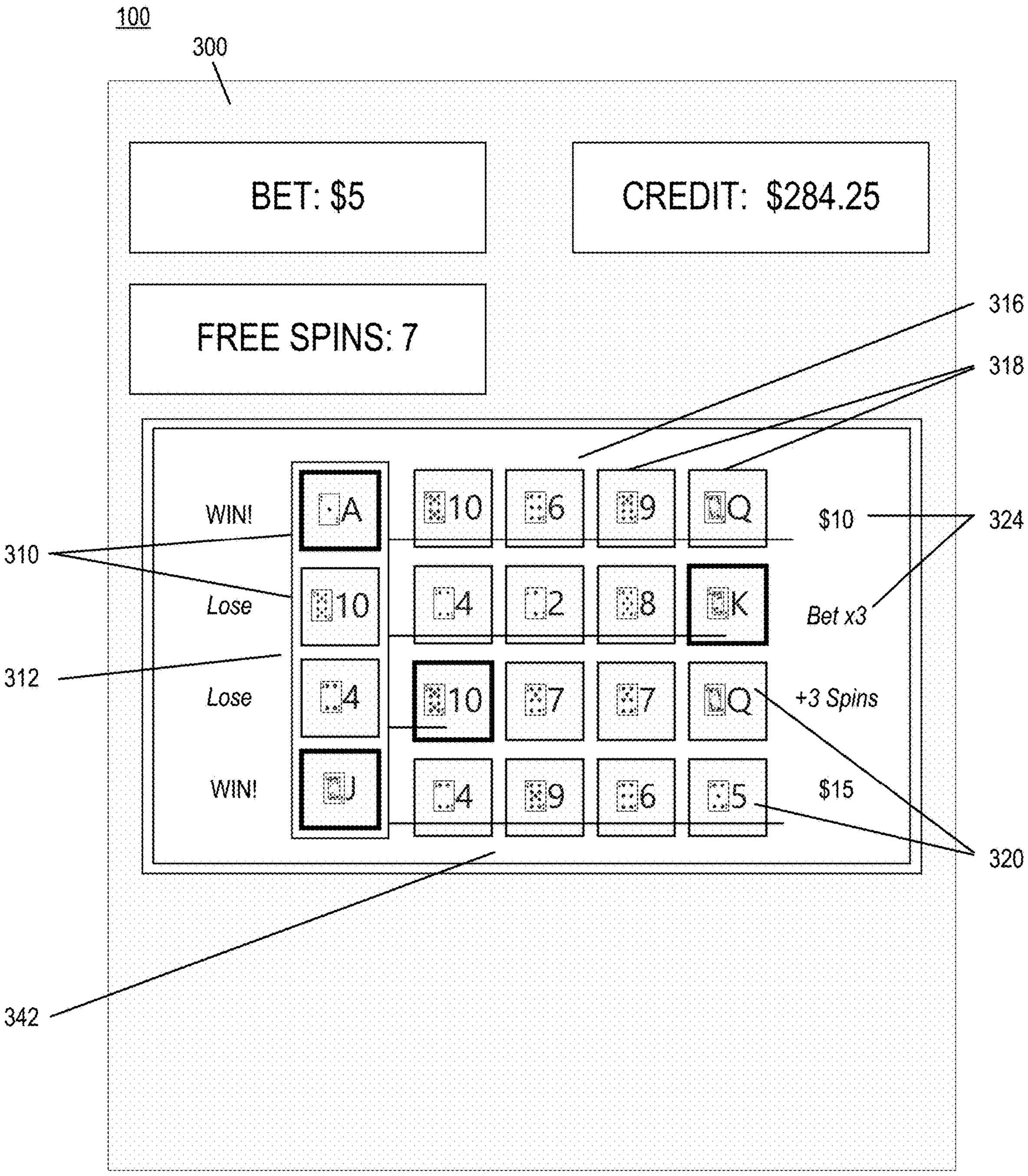

As shown by FIG. 3E, the matrix 316 is rotated to a fourth rotational position 342, with a similar comparison of respective first game symbols 310 and corresponding payline 318, with additional game awards 324 provided based on the comparison.

Figure 4A:
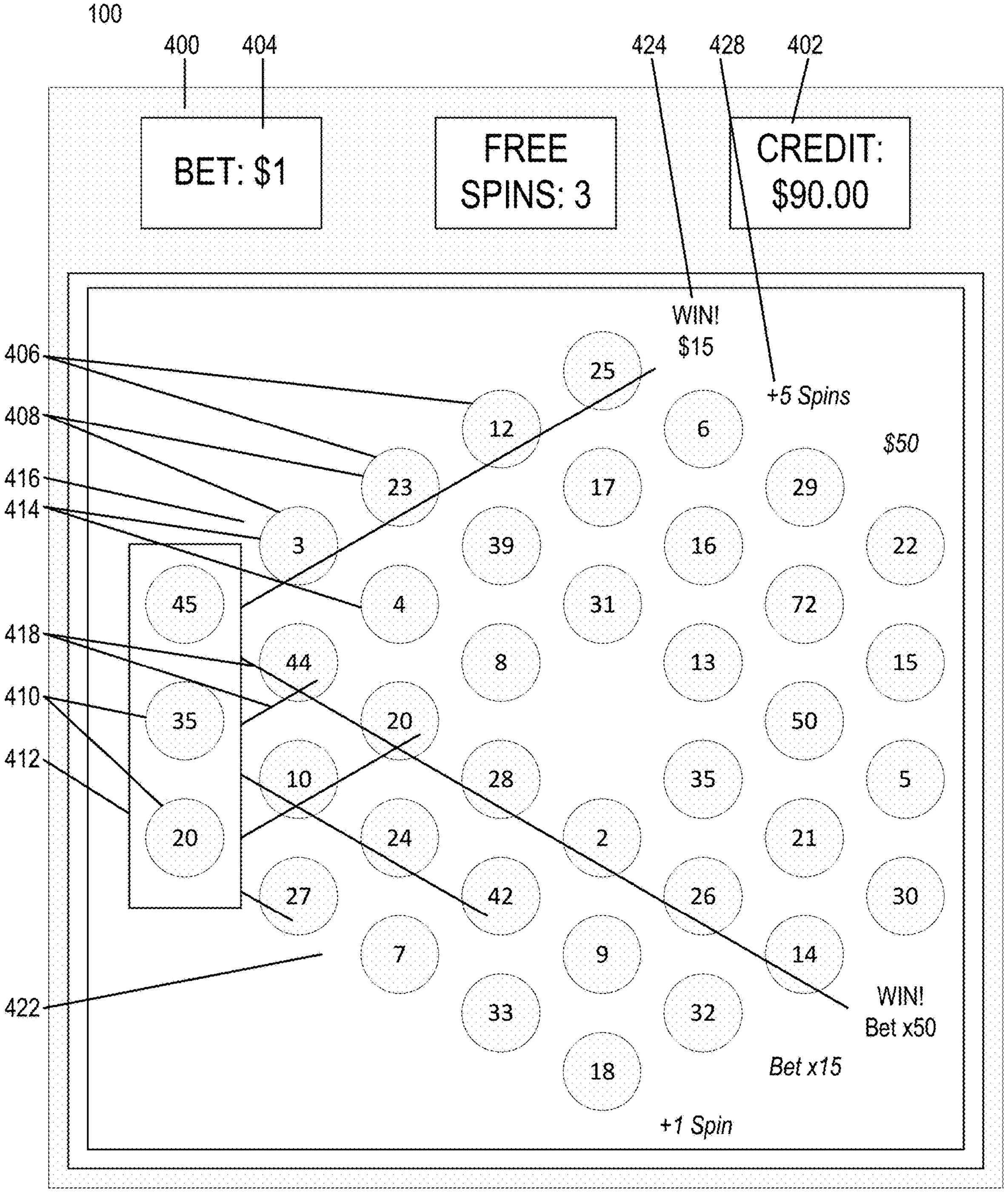
FIGS. 4A-4C are diagrams of the graphical user interface (GUI) illustrating game with a rotating matrix of game symbols, according to some alternate embodiments.
Figure 4B:
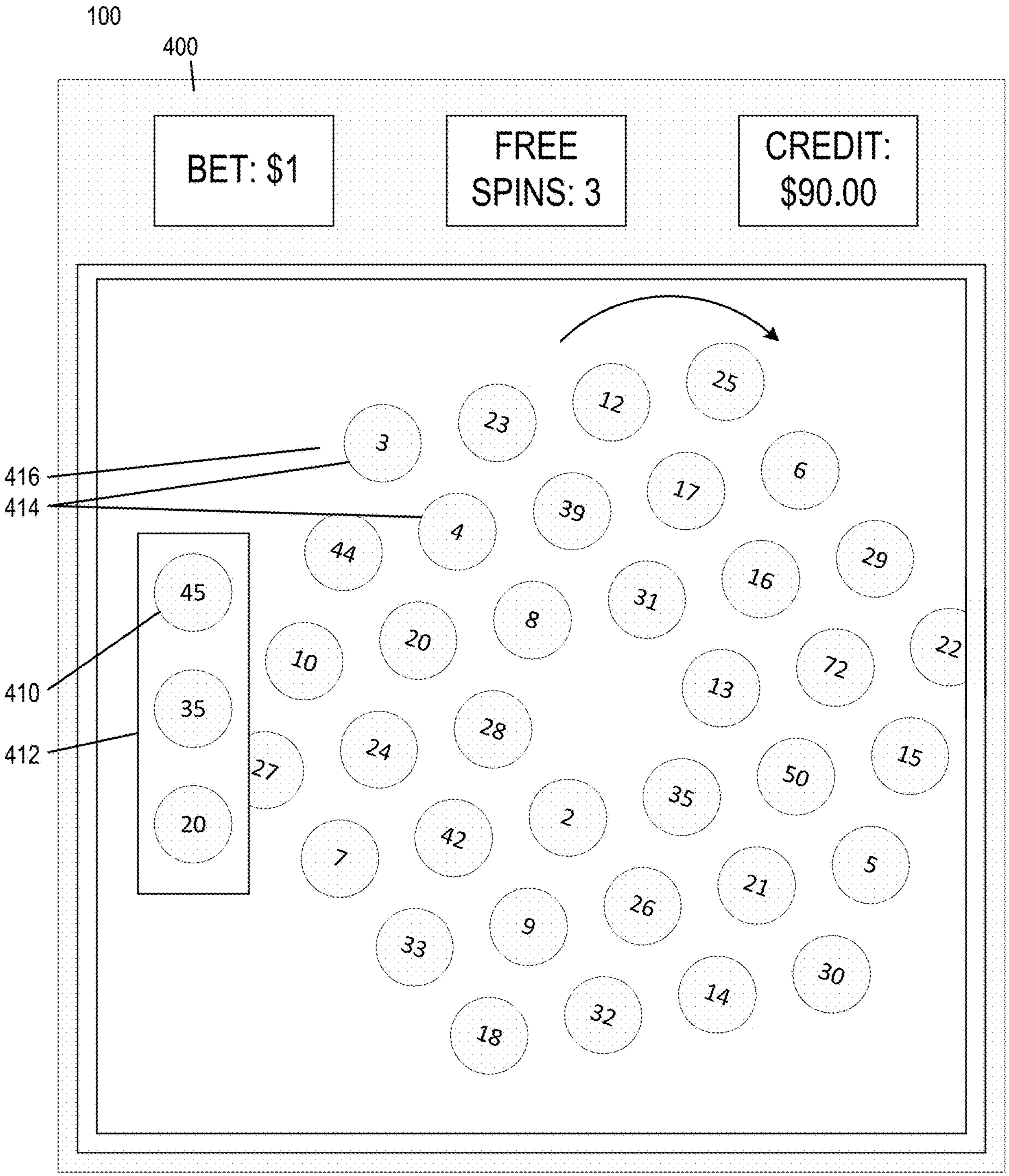
Figure 4C:
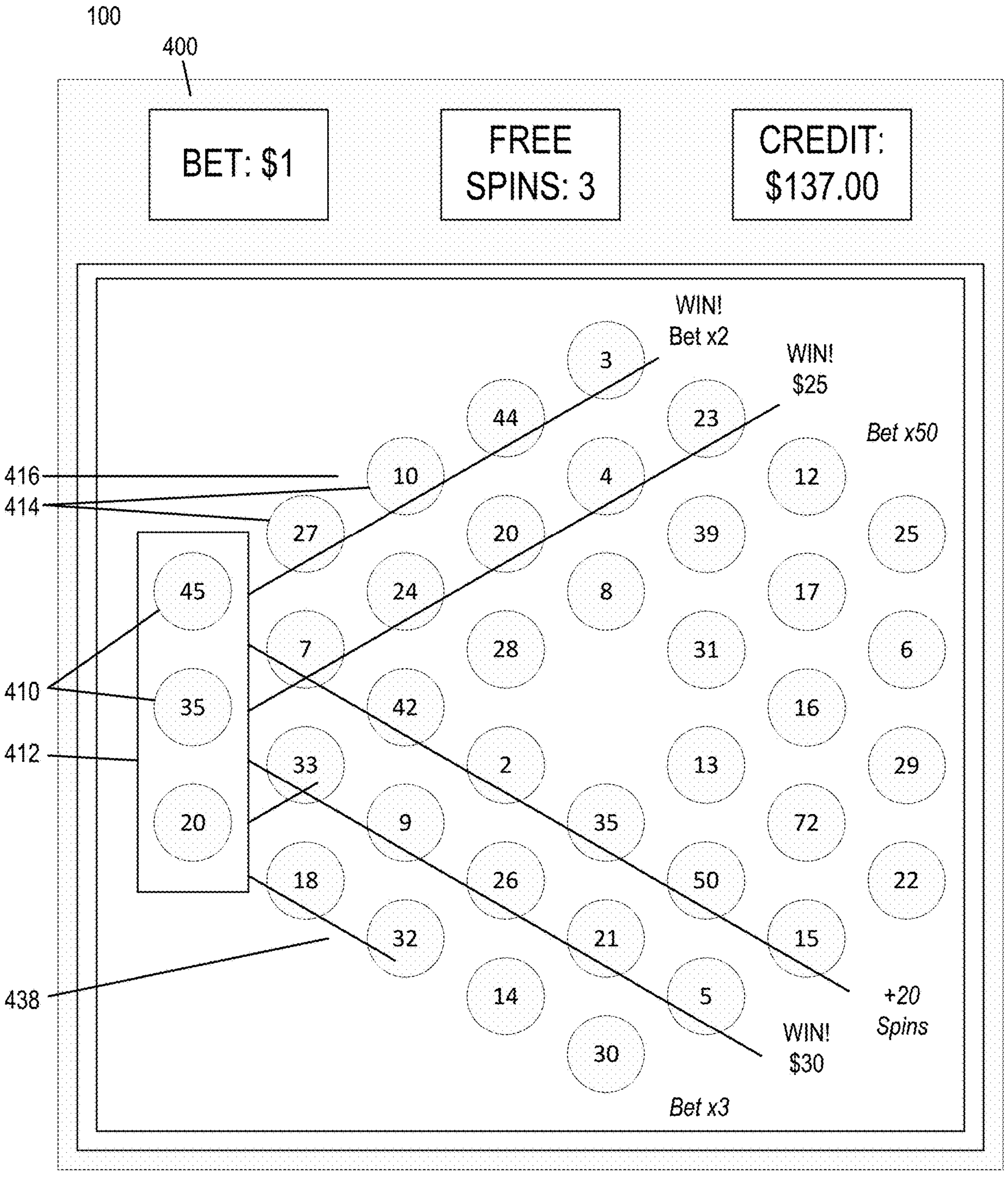

FIG. 4A-4C are diagrams of a graphical user interface (GUI) 400 at an EGM 100 for a wagering game including a bonus game with a rotating non-rectilinear matrix (i.e., hexagonal in this example) of slot symbols, according to some embodiments. The GUI 400 may include a credit meter 402, a bet button 404, and a plurality of game elements 406, including a plurality of game symbols 408 (e.g., slot symbols in this example). As shown in FIG. 4A, the game symbols 408 include a vertical array 412 of N first game symbols 410.

A hexagonal matrix 416 of second game symbols 414 is then provided and displayed in a first rotational position 422, with multiple paylines 418 of second game symbols 414 extending from each first game symbol 410 (two paylines 418 per first game symbol 410 in this example). For each payline 418 of second game symbols 414 in the first rotational position 422, the game determines whether each second game symbol 414 in the respective payline 418 has a higher value than the corresponding first game symbol 410. Based on a determination that none of the second game symbols 414 in the payline 418 have a higher value than the corresponding first game symbol 410, an award 424 for the respective payline 418 is provided to the player.

As with the embodiment of FIGS. 3A-3D, the awards 424 may include different types of awards, as desired. For non-winning paylines 418, the potential award 428 for the row 418 may be displayed as well. In this embodiment, some paylines 418 may have higher numbers of second game symbols 410, which may in turn decrease a statistical probability of a winning result for those paylines 418. In this example, paylines 418 with higher numbers of second game symbols 410 may have larger corresponding awards 424 and/or potential awards 428, as desired.

As shown in FIGS. 4B and 4C, the matrix 416 is next rotated (sixty degrees in this example) to a second rotational position 438 such that each first game symbol 410 of the array 412 corresponds to two new paylines 418 of second game symbols 414. For each payline 418 of second game symbols 414 in the second rotational position 438, the game determines whether each second game symbol 414 in the respective payline 418 has a higher value than the corresponding first game symbol 410, and provides awards 424 for winning paylines 418. As with the example of FIGS. 3A-3D, the matrix 416 can continue to rotate to new rotational positions, and the above operations may be repeated, as desired.

Figure 5:
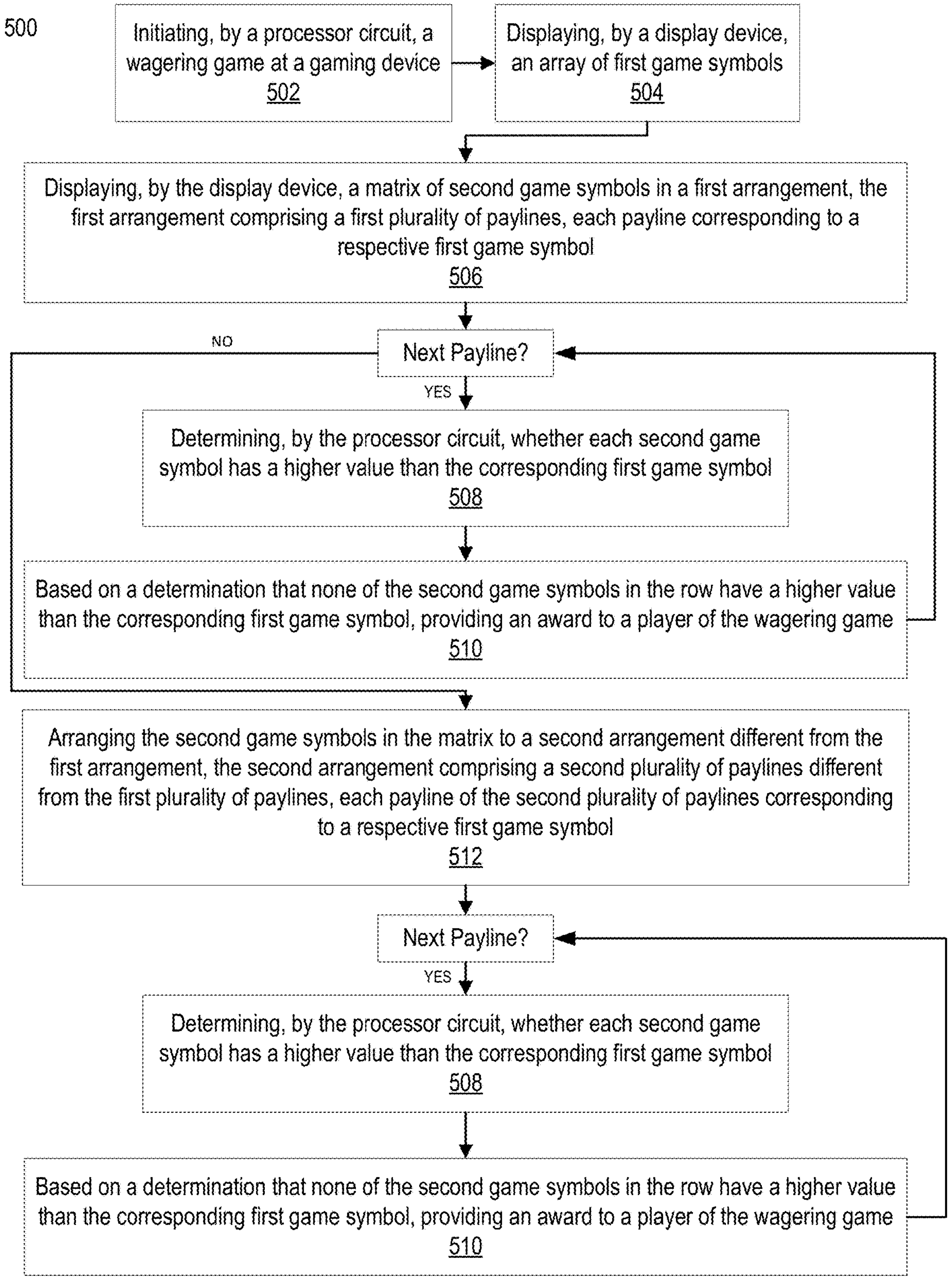
FIG. 5 is a flowchart illustrating operations of systems/methods of a bonus game for a wagering game with a perceived persistence game feature, according to some embodiments.

FIG. 5 is a flowchart illustrating operations 500 of systems/methods of a bonus game for a wagering game with a perceived persistence game feature, according to some embodiments. The operations 500 may include initiating, by a processor circuit, a wagering game at a gaming device (Block 502).

The operations 500 may further include displaying, by a display device, an array of first game symbols (Block 504).

The operations 500 may further include displaying, by the display device, a matrix of second game symbols in a first arrangement, the first arrangement comprising a first plurality of paylines, each payline corresponding to a respective first game symbol (Block 506).

The operations 500 may further include for each payline of the first plurality of paylines in the first arrangement, determining, by the processor circuit, whether each second game symbol has a higher value than the corresponding first game symbol (Block 508), and, based on a determination that none of the second game symbols in the row have a higher value than the corresponding first game symbol, providing an award to a player of the wagering game (Block 510). In this example, after operations 508 and 510 are performed for each payline, the operations determine a next payline and repeats operations 508 and 510.

After operations 508 and 510 are performed for all of the paylines, the operations 500 may further include arranging the second game symbols in the matrix to a second arrangement different from the first arrangement, the second arrangement comprising a second plurality of paylines different from the first plurality of paylines, each payline of the second plurality of paylines corresponding to a respective first game symbol (Block 512).

The operations 500 may further include, for each payline of the second plurality of paylines in the second arrangement, determining, by the processor circuit, whether each second game symbol has a higher value than the corresponding first game symbol (Block 514), and, based on a determination that none of the second game symbols in the payline have a higher value than the corresponding first game symbol, providing an award to a player of the wagering game (Block 516). Here again, after operations 514 and 516 are performed for each payline, the operations determine a next payline and repeats operations 514 and 516.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory coupled to the processor circuit, the memory comprising machine readable instructions that, when executed by the processor circuit, cause the processor circuit to:

initiate a wagering game at a gaming device;

display, by a display device of the gaming device, an array of N first game symbols in a first direction;

display, by the display device, a matrix of second game symbols in a first rotational position, the matrix comprising N columns of second game symbols in the first direction and N rows of second game symbols in a second direction orthogonal to the first direction, each first game symbol of the array corresponding to a respective row of N second game symbols;

for each row of second game symbols in the first rotational position:

determine whether each second game symbol has a higher value than the corresponding first game symbol; and based on a determination that none of the second game symbols in the row have a higher value than the corresponding first game symbol, provide an award to a player of the wagering game;

rotate the matrix to a second rotational position such that each first game symbol of the array corresponds to a respective column of N second game symbols; and for each column of second game symbols in the second rotational position:

determine whether each second game symbol has a higher value than the corresponding first game symbol; and based on a determination that none of the second game symbols in the column have a higher value than the corresponding first game symbol, provide an award to a player of the wagering game.

2. The system of claim 1, wherein the instructions further cause the processor circuit to:

rotate the matrix to a third rotational position different than the first rotational position such that each first game symbol of the array corresponds to a respective row of N second game symbols; and for each row of second game symbols in the third rotational position:

determine whether each second game symbol has a higher value than the corresponding first game symbol; and based on a determination that none of the second game symbols in the row have a higher value than the corresponding first game symbol, provide an award to a player of the wagering game.

3. The system of claim 2, wherein the instructions further cause the processor circuit to:

rotate the matrix to a fourth rotational position different than the second rotational position such that each first game symbol of the array corresponds to a respective column of N second game symbols; and for each row of second game symbols:

determine whether each second game symbol has a higher value than the corresponding first game symbol; and based on a determination that none of the second game symbols in the row have a higher value than the corresponding first game symbol, provide an award to a player of the wagering game.

4. The system of claim 1, wherein the array of first game symbols and the matrix of second game symbols comprise slot symbols.

5. The system of claim 1, wherein the array of first game symbols and the matrix of second game symbols comprise playing card symbols.

6. The system of claim 1, wherein each award provided to the player is selected from one of a monetary award, a number of free spins, and a multiplier award.

7. The system of claim 1, wherein the instructions further cause the processor circuit to, for each row of second game symbols in the first rotational position, based on a determination that any of the second game symbols in the row have a higher value than the corresponding first game symbol, display an indication of a potential award for the row; and wherein, for each column of second game symbols in the second rotational position, based on a determination that any of the second game symbols in the column have a higher value than the corresponding first game symbol, display an indication of a potential award for the column.

8. The system of claim 1, wherein N is an even integer.

9. The system of claim 8, wherein N=4.

10. A gaming device comprising:

an input device;

a display device;

a processor circuit; and a memory coupled to the processor circuit, the memory comprising machine readable instructions that, when executed by the processor circuit, cause the processor circuit to:

based on receipt of a game initiation input at the input device, initiate a wagering game;

display, the display device, an array of first game symbols;

display, by the display device, a matrix of second game symbols in a first arrangement, the first arrangement comprising a first plurality of paylines, each payline corresponding to a respective first game symbol;

for each payline of the first plurality of paylines in the first arrangement:

determine whether each second game symbol has a higher value than the corresponding first game symbol; and based on a determination that none of the second game symbols in the row have a higher value than the corresponding first game symbol, provide an award to a player of the wagering game;

arrange the second game symbols in the matrix to a second arrangement different from the first arrangement, the second arrangement comprising a second plurality of paylines different from the first plurality of paylines, each payline of the second plurality of paylines corresponding to a respective first game symbol; and for each payline of the second plurality of paylines in the second arrangement:

determine whether each second game symbol has a higher value than the corresponding first game symbol; and based on a determination that none of the second game symbols in the payline have a higher value than the corresponding first game symbol, provide an award to a player of the wagering game.

11. The gaming device of claim 10, wherein the matrix is a rectilinear matrix, and wherein arranging the second game symbols in the matrix to the second arrangement comprises rotating the first arrangement ninety degrees.

12. The gaming device of claim 10, wherein the matrix is a hexagonal matrix, and wherein arranging the second game symbols in the matrix to the second arrangement comprises rotating the first arrangement sixty degrees.

13. The gaming device of claim 10, wherein the instructions further cause the processor circuit to:

arrange the second game symbols in the matrix to a third arrangement different from the first arrangement and the second arrangement, the third arrangement comprising a third plurality of paylines different from the first plurality of paylines and the second plurality of paylines, each payline of the third plurality of paylines corresponding to a respective first game symbol; and for each payline of the third plurality of paylines in the third arrangement:

determine whether each second game symbol has a higher value than the corresponding first game symbol; and based on a determination that none of the second game symbols in the payline have a higher value than the corresponding first game symbol, provide an award to a player of the wagering game.

14. The gaming device of claim 10, wherein the array of first game symbols and the matrix of second game symbols comprise slot symbols.

15. The gaming device of claim 10, wherein the array of first game symbols and the matrix of second game symbols comprise playing card symbols.

16. The gaming device of claim 10, wherein each award provided to the player is selected from one of a monetary award, a number of free spins, and a multiplier award.

17. The gaming device of claim 10, wherein the instructions further cause the processor circuit to, for each payline of second game symbols in the first arrangement, based on a determination that any of the second game symbols in the row have a higher value than the corresponding first game symbol, display an indication of a potential award for the row; and wherein, for each payline of second game symbols in the second arrangement, based on a determination that any of the second game symbols in the row have a higher value than the corresponding first game symbol, display an indication of a potential award for the row.

* * * * *